Jan. 29, 1929.
S. L. BRIGHT
1,700,429
REFRIGERATING METHOD AND APPARATUS
Filed Aug. 20, 1927     2 Sheets-Sheet 1
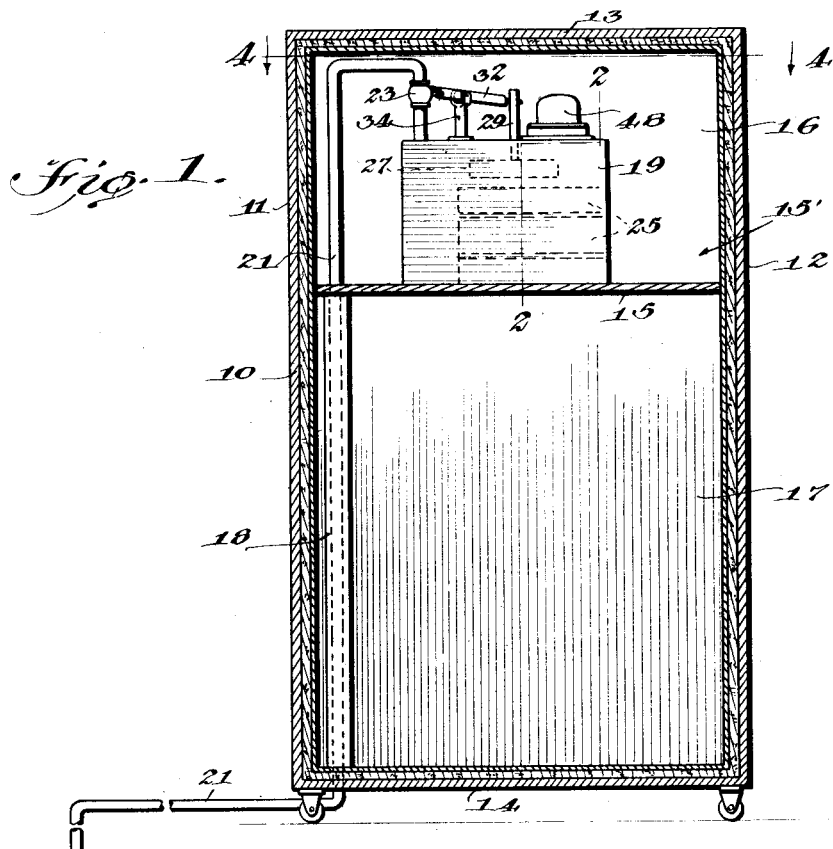
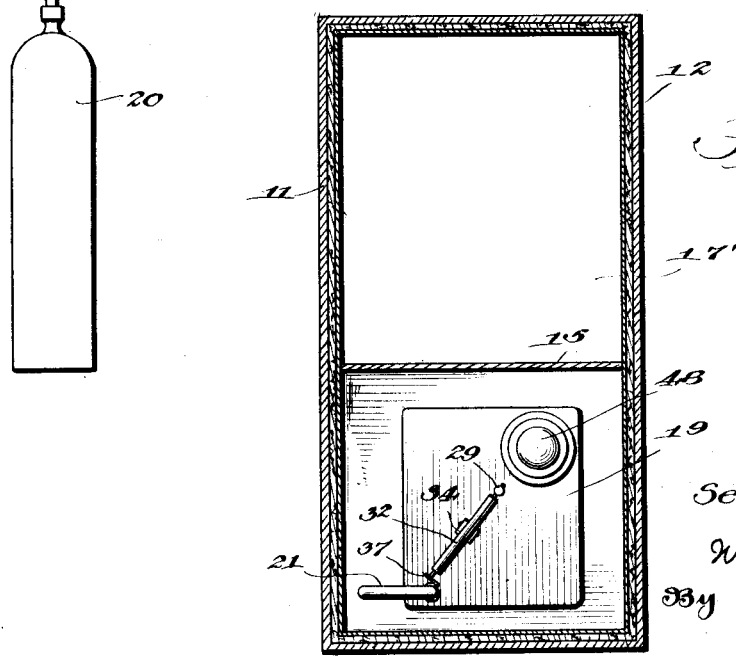
Inventor
Seth L. Bright,
By Whittemore Hulbert
Whittemore & Belknap
Attorneys

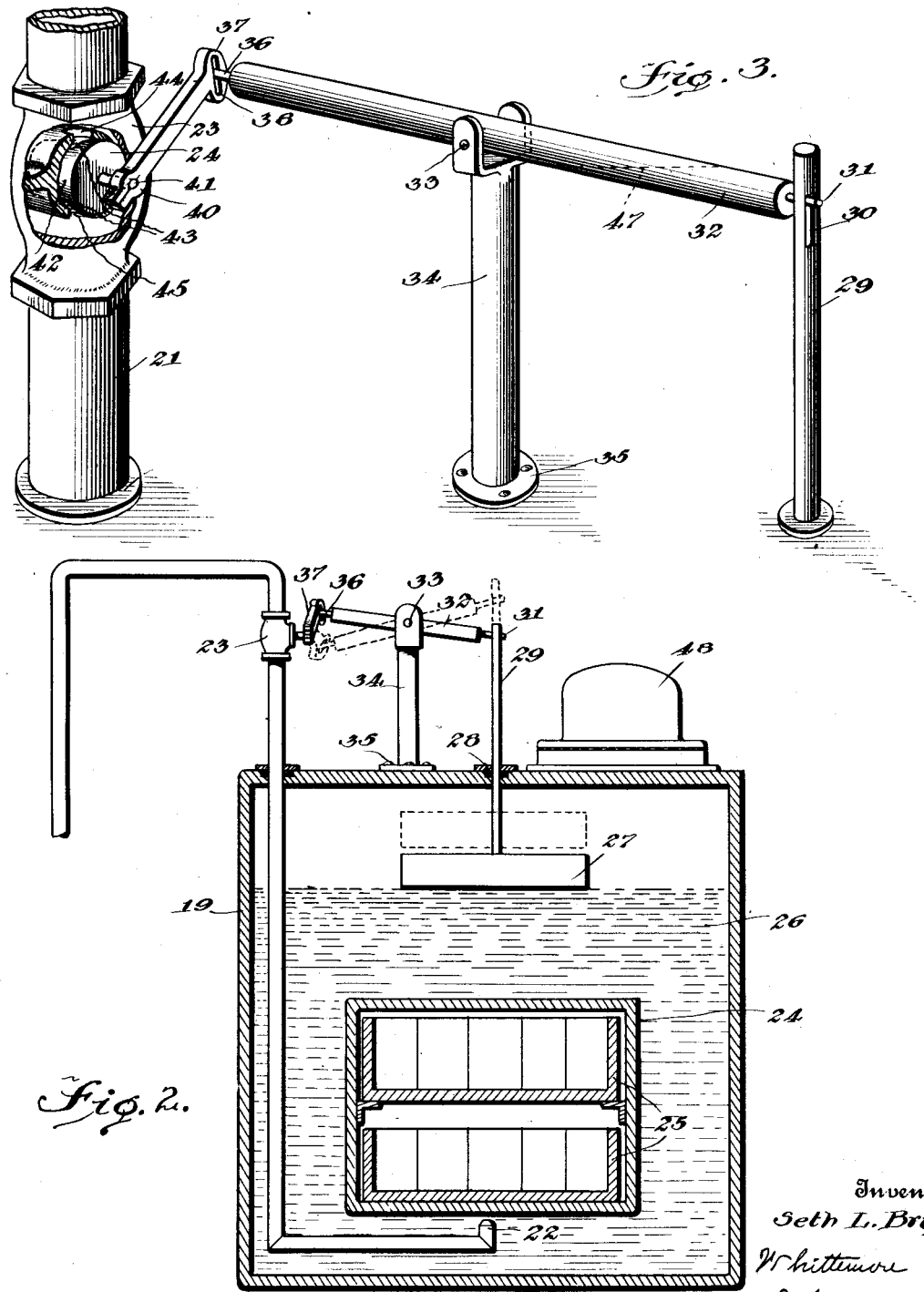

Patented Jan. 29, 1929.

1,700,429

UNITED STATES PATENT OFFICE.

SETH L. BRIGHT, OF DETROIT, MICHIGAN, ASSIGNOR TO G. F. LATHROP AND JOHN J. DODGE, BOTH OF DETROIT, MICHIGAN.

REFRIGERATING METHOD AND APPARATUS.

Application filed August 20, 1927. Serial No. 214,392.

This invention relates to a refrigerating method and apparatus and has particular reference to a method and apparatus of this character which will find great utility in domestic use.

The great disadvantage of domestic refrigerating units as now constructed is the impossibility of installing these units in sections where electricity is not obtainable, since in so far as I am aware, practically all of the so called mechanical refrigerating units now in use rely for their operation on a source of electric current. My invention therefore contemplates the production of a refrigerating unit which may be installed in any locality regardless of the proximity of a source of electric current, since by my method and apparatus I procure automatic refrigeration without the use of electricity in any form whatever. It will be obvious also that since my method and apparatus does not rely on a source of electricity for its operation, it will find particular utility on camping trips and in portable kitchens. My invention however is not to be construed as only practical where electric power is not easily obtained but is to be considered as practical and economical for use wherever automatic refrigeration is desired. By my method and apparatus I eliminate the complicated valve actuating mechanisms now usually incorporated in automatic refrigerating units. I eliminate also the thermally actuated valves, the expensive compressor units, and in fact much of the structure now considered indispensable in refrigerating units.

My invention therefore has as an object to provide an inexpensive and yet thoroughly efficient refrigerating unit capable of use in any locality at any time.

A further object of my invention is to provide a refrigerating unit which may be installed in any refrigerator and which will function efficiently regardless of how poorly constructed that refrigerator happens to be.

A still further object of my invention is to provide a novel valve actuating mechanism for my refrigerating unit which shall be simple in construction and automatic in its operation.

Further objects and advantages of my invention will become more apparent as the following description proceeds.

In my method I contemplate the provision of a brine solution and the freezing of this brine solution, thus differing drastically from methods heretofore used wherein the brine solution is normally maintained as a liquid. I provide a suitable brine tank which may be readily positioned in any standard refrigerator and in this brine tank I place a brine solution of calcium chloride. By using calcium chloride I am able to obtain an extremely low freezing point for my brine solution and by varying the amount of calcium chloride I am able to correspondingly vary the freezing point of the solution. I utilize this factor in varying my brine solution to suit the particular requirements of the refrigerator in which the unit is to be installed. For example in a refrigerator which is not very air tight, I use a strong solution of calcium chloride as my brine solution thereby obtaining an extremely low freezing point. More particularly if I use approximately five pounds of calcium chloride with the quantity of water normally used, I obtain a brine solution having a freezing point of approximately 57° below zero and I have found that if the refrigerating unit is maintained at substantially 67° below zero it will be sufficiently cold to thoroughly chill and keep cool any refrigerator regardless of how faultily constructed that refrigerator might be. For refrigerators that are better constructed and therefore more air tight, I use a lesser amount of calcium chloride in my brine solution, thus raising the freezing point of the brine solution and slightly raising the temperature at which my refrigerating unit is maintained.

Into the brine tank containing the properly prepared brine solution, I flow liquid carbon dioxide from a suitable source under pressure. I have found that by the addition of certain chemicals to the carbon dioxide, I am able to maintain the carbon dioxide in a liquid form regardless of the pressure to which it is subjected and I therefore mix with the carbon dioxide these desired chemicals so that the same will always be in a liquid form. The compressed liquefied carbon dioxide is conducted to a point within the brine tank wherein it is permitted to expand into intimate contact with the brine solution. The expansion of the carbon dioxide freezes the brine solution and provides a refrigerating unit housing a block of extremely cold ice. As brought out before, I vary the point at which the brine freezes by varying the amount of calcium chloride in solution so that it will be readily understood that if I have five pounds of calcium chloride in solution, I will have formed a block of ice having a temperature of approximately 57° below zero.

For controlling the supply of the carbon dioxide to the brine solution I utilize the changing in volume of the brine solution incident to its freezing. As the volume of the brine solution increases I utilize this increase in volume to actuate a valve which controls the flow of refrigerant from the source under pressure to within the brine tank.

I contemplate the provision of the refrigerant in sealed containers which may be purchased by the individuals using my refrigerating apparatus, placed at some point distant from the unit and connected to the unit to automatically supply the required amount of refrigerant to the brine tank. Obviously when the supply of refrigerant is exhausted it may easily be replaced by a new tank of the refrigerant thus assuring a constant economical operation of the refrigeration unit.

For carrying out my method I have provided the apparatus disclosed in the accompanying drawings wherein:

Figure 1 is a sectional view through a standard refrigerator equipped with my refrigerating apparatus:

Figure 1 is a sectional view through the refrigerating unit itself and taken on the line 2—2 of Figure 1;

Figure 3 is a detail perspective view showing the novel type of valve actuating mechanism which I have provided; and Figure 4 is a sectional view taken on the line 4—4 of Figure 1.

Referring now more particularly to the drawings wherein like reference characters indicate corresponding parts throughout all views of the same, the reference character 10 indicates generally a refrigerator having the rear wall 11, front wall 12 and top and bottom walls 13 and 14 respectively. 15 represents a suitable shelf within the refrigerator which is generally provided for separating the ice containing portion of the refrigerator 16 from the food receiving portion of the refrigerator 17. 15' designates a vertical partition within the refrigerator for dividing the food receiving portion 17' from the portions 16 and 17. As usual in refrigerators of this character, a drain pipe 18 is provided extending from the ice receiving space 16 to a point outside of the refrigerator. All of this is of the usual construction and forms no part of my invention.

My refrigerating unit includes a container 19 which is adapted to be positioned within the refrigerator 10 in the space usually occupied by the ice. This container 19 constitutes a brine tank and is adapted to receive a refrigerant from a source of refrigerant indicated by the reference character 20. As illustrated the source of refrigerant may be an elongated container of the type generally used for storing and shipping liquids and gases under pressure and in use this container may be stored in the cellar or any out of the way place of the residence in which the refrigerating unit is to be used. Extending from the container 20 and to within the brine tank 19 is a suitable conduit 21 which is adapted to enter the refrigerator through the drain pipe 18 and extend upwardly to a point adjacent the top of the ice receiving chamber 16 and then downwardly through a suitable packed opening in the top of the brine tank to a point adjacent the central lower end of the brine tank. As clearly illustrated in Figures 1 and 2 the conduit 21 is bent within the brine tank to form the upwardly directed nozzle 22 arranged centrally of and adjacent the lower end of the brine tank.

The conduit 21 carries a valve fitting 23 forming a housing for a valve 24 which controls the flow of the refrigerant from the source to within the brine tank.

Within the brine tank and arranged in spaced relation to the walls thereof is a suitable container 24 carrying the trays 25 in which ice cubes may be made. Also within the brine tank 19 and surrounding the container 24 is a brine solution 26 which as brought out before preferably comprises a solution of calcium chloride. The refrigerant entering the brine tank through the conduit 21 and nozzle 22 expands within the brine tank in intimate contact with the brine solution whereby the brine solution is frozen to form a solid cake of ice. While I have described the refrigerant as being carbon dioxide and the brine as a solution of calcium chloride it is to be clearly understood that these two substances are not the only ones which may be used in my method or with my apparatus since any refrigerant or any brine solution may be used in so far as they possess the particular qualities desired.

For actuating the valve 24 and thereby controlling the flow of refrigerant through the conduit 21 I provide means responsive to the change in volume of the brine solution incident to its freezing. It is well known that when a liquid freezes it expands and I therefore provide a member 27 which initially floats on the top of the brine solution as clearly indicated in Figure 2 of the drawing. Carried by the member 27 and projecting through a suitable packed opening 28 in the top of the brine tank is a stem 29. The stem 29 is slotted as at 30 and is thereby loosely connected to a stud 31 carried by one end of a hollow tube 32. The hollow tube 32 is pivotally supported as at 33 by a bracket 34 secured as at 35 to the top of the brine tank. The opposite end of the tube 32 is provided with a stud 36 which is loosely connected to a lever 37 as by engagement in the slot 38. The lever 37 is rigidly secured as at 40 to the projecting end 41 of the valve stem of the valve 24.

While the valve 24 may be of any desired type, I have shown the same as comprising a truncated cone-shaped body portion 42 provided with a passage 43 adapted to register with ports 44 and 45 respectively in the fitting 23 carried by the conduit 21. Obviously registration of the passage 43 with the ports 44 and 45 permits a flows of the refrigerant through the tube 21 to within the brine tank, while movement of the valve to position the passage 43 out of registration with the ports 44 and 45 cuts off the flow of the refrigerant to the brine tank.

It is desirable that the tube 32 be quickly thrown from one extreme position to the other about its pivot 33 and I therefore mount within the tube a suitable shifting weight indicated generally by the reference character 47 in Figure 3 of the drawing. This shifting weight may comprise mercury or lead balls or any substance which will quickly flow from one end of the tube to the other depending upon the movement of the tube about its pivot.

For permitting the escape of the refrigerant from the brine tank after the same has expanded and cooled the brine solution I provide a separator indicated generally by the reference character 48. This separator is described in detail in my co-pending application filed on even date herewith, Serial No. 214,396 and forms no part of the subject matter of this invention.

In operation and with the parts in position as illustrated in Figure 3, that is with the valve 24 open and the member 27 floating on top of the liquid brine, refrigerant flows through the conduit 21 the nozzle 22 and expands within the brine tank in intimate contact with the brine solution. The brine solution in freezing expands and raises the member 27 to the dotted line position shown in Figure 2 whereupon the tube 32 is tilted about its pivot, the shifting weight 47 moving to the other end of the tube quickly completes the movement of the tube about its pivot to move the lever 37 downwardly and to close the valve 24 thus cutting off the flow of the refrigerant to within the brine tank. Obviously upon the melting of the brine ice the member 27 will again fall to its initial position whereupon the tube 32 will be tilted in the other direction about its pivot and the valve 24 opened.

When the brine is frozen, which will be its normal condition during the operation of my unit, the receptacle 19 will constitute to all intents and purposes, a casing for a block of ice. It will however, be more efficient in cooling the refrigerator than would an ordinary cake of ice, since as brought out before its temperature will be approximately 57° below zero or some other extremely low temperature sufficient to maintain the entire refrigerator at the desired temperature. Where a block of ordinary ice would have a temperature of approximately 32° above zero the ice within my unit will have a temperature many degrees lower, thus assuring a positive cooling of all parts of the refrigerator. Further upon the melting of the ice within my unit, the valve mechanism actuates to form more ice thus assuring the maintaining of the unit at the desired low temperature.

From the above, it will be obvious that I have provided a refrigerating unit which may be operated without the use of electricity. It will further be obvious that I have provided automatic valve actuating mechanism which is controlled by the change in volume of the brine solution and which will cut off the supply of refrigerant upon the freezing of the brine solution and therefore upon the attainment of the desired temperature within the unit.

While I have described one method and one apparatus somewhat in detail, it is to be clearly understood that this description is not to be construed as definitive of the limits of my inventive idea. I therefore reserve the right to make such changes in my method and apparatus as will fall within the purview of the attached claims.

What I claim as my invention is:

1. The method of refrigeration which consists in discharging a refrigerant into a brine solution to freeze the brine solution, and controlling the discharge of the refrigerant by the change in volume of the brine incident to its freezing.

2. The method of refrigeration which consists in freezing a solution by a flow of a refrigerant and controlling the flow of the refrigerant by the expansion of the solution incident to the freezing of the same.

3. The method of refrigeration which consists in freezing a solution of calcium chloride by expanding in the said solution a quantity of liquefied carbon dioxide, and controlling the supply of the carbon dioxide by the variation in the volume of the said solution.

4. That method of refrigeration which consists in supplying a refrigerant to cool a brine solution and controlling the supply of refrigerant by variations in the volume of the solution.

5. In a refrigerating apparatus in combination a brine tank, a source of refrigerant, means for expanding the refrigerant directly in the brine tank and means actuated by the variations in the volume of the brine for automatically regulating the supply of the refrigerant to the brine tank.

6. In a refrigerating apparatus, a brine tank adapted to contain a quantity of brine solution, a source of refrigerant for freezing the brine solution, means for conducting the refrigerant to the brine tank and means operable by changes in the volume of the brine solution for controlling the supply of the refrigerant to the brine tank.

7. In a refrigerating apparatus in combination a tank, a solution of calcium chloride in the said tank, a source of liquefied carbon dioxide under pressure, means for conducting the carbon dioxide to within the tank and for expanding the same in contact with the said solution, and means for automatically controlling the supply of carbon dioxide to the said tank by the expansion incident to the freezing of the solution.

8. In a refrigerating apparatus, in combination, a tank, a solution of calcium chloride in the said tank, a source of liquefied carbon dioxide under pressure, means for conducting the carbon dioxide to within the tank and for expanding the same in contact with the said solution, and means operable by changes in volume of the said solution for controlling the supply of carbon dioxide to the said tank.

9. In a refrigerating apparatus in combination a tank adapted to contain a brine solution, means for flowing a refrigerant into the brine solution to freeze the same, a member within the tank adapted to be floated by the brine solution, and a valve actuated by the said member for controlling the flow of refrigerant to within the tank.

10. In combination, a tank adapted to contain a brine solution, a conduit for conducting a refrigerant into contact with the brine solution to freeze the same, a member within the tank adapted to be moved by the change in volume of the brine solution caused by the freezing of the same, a valve in the refrigerant conduit, a pivoted arm connected to the said valve, means for quickly throwing the said arm when the same is moved a predetermined distance about its pivot, and a connection between the said arm and the said member within the tank whereby movement of the said member actuates the said valve.

11. A refrigerating system including in combination, a source of refrigerant under pressure, a brine tank adapted to be positioned within a refrigerator, a connection between the source of refrigerant and the brine tank, a brine solution within the brine tank, a valve in the said connection, a pivoted lever operatively connected to the said valve, the said lever being provided with a shifting weight, a member floated by the said brine solution, adapted to be moved by the increase in volume of the brine solution incident to the freezing of the same, and a connection between said member and said pivoted lever, whereby movement of the said member actuates the said valve.

In testimony whereof I affix my signature.

SETH L. BRIGHT.